United States Patent
Shin et al.

(10) Patent No.: US 11,679,809 B2
(45) Date of Patent: Jun. 20, 2023

(54) BATTERY PROTECTION STRUCTURE FOR VEHICLE BODY

(71) Applicants: HYUNDAI MOTOR COMPANY, Seoul (KR); KIA MOTORS CORPORATION, Seoul (KR)

(72) Inventors: Seong Su Shin, Seoul (KR); Jang Won Hong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/158,338

(22) Filed: Jan. 26, 2021

(65) Prior Publication Data

US 2022/0073142 A1   Mar. 10, 2022

(30) Foreign Application Priority Data

Sep. 4, 2020   (KR) ........................ 10-2020-0113121

(51) Int. Cl.
| | |
|---|---|
| *B62D 21/15* | (2006.01) |
| *B62D 25/02* | (2006.01) |
| *B62D 25/08* | (2006.01) |
| *B62D 27/00* | (2006.01) |
| *B60K 1/04* | (2019.01) |
| *B62D 25/20* | (2006.01) |
| *B60L 50/64* | (2019.01) |

(52) U.S. Cl.
CPC ......... *B62D 21/157* (2013.01); *B62D 25/025* (2013.01); *B62D 25/08* (2013.01); *B62D 27/00* (2013.01); *B60K 1/04* (2013.01); *B60K 2001/0438* (2013.01); *B60L 50/64* (2019.02); *B60Y 2306/01* (2013.01); *B62D 21/152* (2013.01); *B62D 25/20* (2013.01); *B62D 25/2036* (2013.01); *Y02T 10/70* (2013.01)

(58) Field of Classification Search
CPC .... B62D 21/157; B62D 25/025; B62D 25/08; B62D 27/00; B62D 21/152; B62D 25/20; B62D 25/2036; B60K 2001/0438; B60K 1/04; B60Y 2306/01; Y02T 10/70; B60L 50/64
USPC ...................................... 296/187.1
See application file for complete search history.

(56) References Cited

U.S. PATENT DOCUMENTS

| 8,074,757 B2 | 12/2011 | Wagner et al. |
| 10,559,795 B1 | 2/2020 | Madasamy et al. |
| 2013/0088045 A1* | 4/2013 | Charbonneau ..... B62D 25/2036 296/187.12 |

(Continued)

FOREIGN PATENT DOCUMENTS

| JP | 2019-010999 A | 1/2019 |
| JP | 2020-026220 A | 2/2020 |
| KR | 10-1262537 A | 5/2013 |

(Continued)

*Primary Examiner* — Joseph D. Pape
*Assistant Examiner* — Dana D Ivey
(74) *Attorney, Agent, or Firm* — Morgan, Lewis & Bockius LLP (57) ABSTRACT

A vehicle body includes: side sills coupled to opposite sides of the vehicle body in a forward-rearward longitudinal direction of the vehicle body, rear lower members coupled between the side sills and front side members, and a lower bar coupled to the side sills while being coupled to the rear lower members in a lateral direction of the vehicle body.

9 Claims, 13 Drawing Sheets

(56) References Cited

U.S. PATENT DOCUMENTS

2014/0333056 A1* 11/2014 Yoshida ................. B62D 27/06
                                                        280/834
2014/0338999 A1* 11/2014 Fujii ....................... B60L 58/26
                                                        180/68.5

FOREIGN PATENT DOCUMENTS

| KR | 101262537 B1 * | 5/2013 |
| KR | 10-2019-0021167 A | 3/2019 |

* cited by examiner

BATTERY PROTECTION STRUCTURE FOR VEHICLE BODY

CROSS-REFERENCE TO RELATED APPLICATION

This application claims the benefit of priority to Korean Patent Application No. 10-2020-0113121, filed on Sep. 4, 2020 in the Korean Intellectual Property Office, the disclosure of which is herein incorporated by reference in its entirety.

TECHNICAL FIELD

The present disclosure relates to a vehicle body capable of safely protecting a high-voltage battery at the time of side crash and front crash of a vehicle.

TECHNICAL FIELD

An electric vehicle is provided with a high-voltage battery instead of a fuel tank.

In the case in which the high-voltage battery is damaged at the time of crash of the electric vehicle, fire may occur. For this reason, it is necessary to protect the high-voltage battery at the time of crash of the electric vehicle.

In the case in which the high-voltage battery is loaded at the lower part of a center floor of the electrical vehicle, the periphery of the high-voltage battery at the lower part of the vehicle is wrapped by a reinforcement structure against crash, which is heavy.

In most cases, the high-voltage battery is mounted to a side sill (or a rocker panel) of a vehicle body. As a result, an absolute crash absorption space is insufficient, compared to an internal combustion engine. Consequently, the vehicle body is designed based on the concept that rigidity of the interior of the side sill or the side sill itself is increased such that a barrier cannot penetrate battery cells in order to provide against side crash.

In front crash, however, a front subframe and parts mounted in a PE room are pushed rearwards by the barrier, rather than penetration of the barrier, unlike the side crash. As a result, the parts strike the high-voltage battery, whereby the front part of the high-voltage battery is damaged.

Therefore, there is a need for a vehicle body capable of protecting the high-voltage battery at the time of front crash as well as side crash of the electric vehicle.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure has been made in view of the above problems, and it is an object of the present disclosure to provide a vehicle body capable of safely protecting a high-voltage battery at the time of side crash and front crash of a vehicle.

In accordance with the present disclosure, the above and other objects can be accomplished by the provision of a vehicle body including side sills coupled to opposite sides of the vehicle body in a forward-rearward longitudinal direction of the vehicle body, rear lower members coupled between the side sills and front side members, and a lower bar coupled to the side sills while being coupled to the rear lower members in a lateral direction of the vehicle body.

The side sills may be coupled to opposite ends of the lower bar in a U shape.

A side reinforcement member having a lattice-shaped section may be provided in each of the side sills in a longitudinal direction, and a corresponding end of the lower bar may be coupled to a front end of the side reinforcement member.

A through-hole may be formed in each of the rear lower members in the lateral direction, and the lower bar may extend through the through-hole and may be coupled to the rear lower member.

A rib may be formed in the lower bar so as to extend between front and rear inner walls thereof.

The lower bar may include a center lower bar and side lower bars, a center insertion recess open at the inside thereof and a side insertion recess open at the outside thereof may be formed in each of the rear lower members in the lateral direction, the center lower bar may be inserted into and coupled to the center insertion recesses, and each of the side lower bars may be inserted into and coupled to a corresponding one of the side insertion recesses.

The side insertion recesses may be formed at the rear of the center insertion recess, whereby the center lower bar may be located farther forwards than the side lower bars.

Cover panels may be coupled so as to cover coupling portions between the side sills and the lower bar together with outer surfaces of the rear lower members.

The lower bar may be disposed in front of a high-voltage battery so as to be spaced apart therefrom by a predetermined distance.

The lower bar may be disposed at the rear of a front subframe so as to be spaced apart therefrom by a predetermined distance.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the exemplary embodiments of the present disclosure, examples of which are illustrated in the accompanying drawings.

Figure 1:
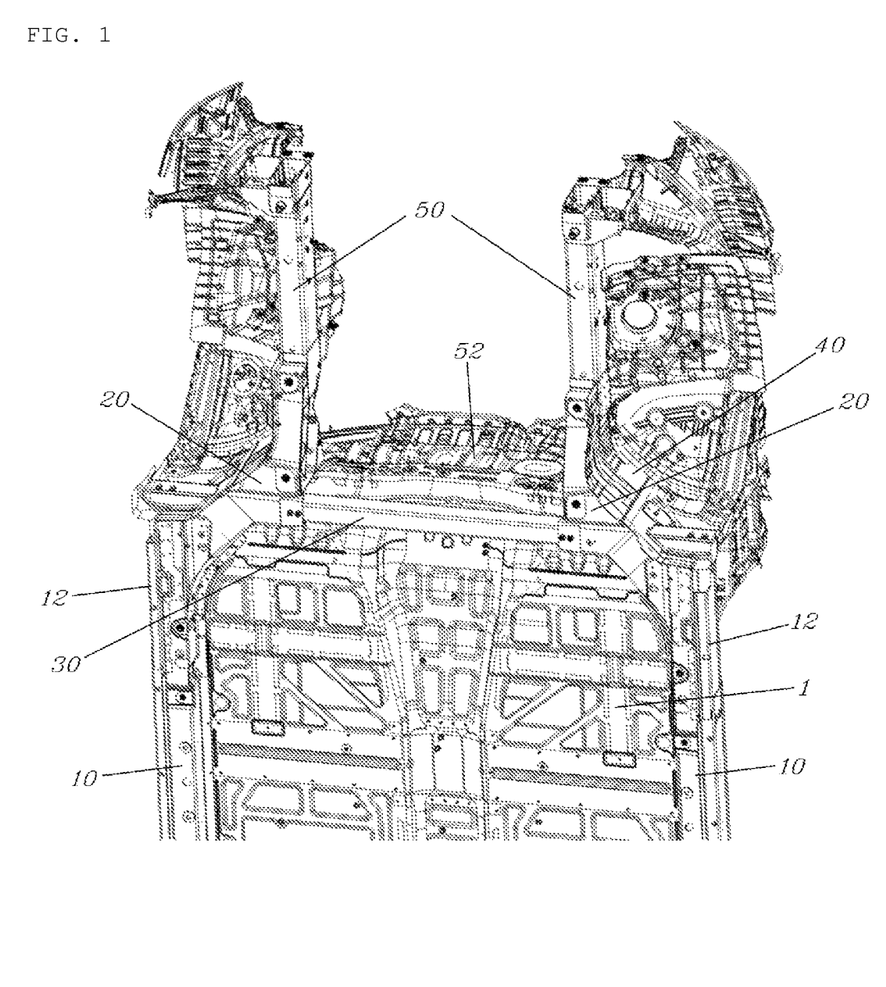
FIG. 1 is a view showing the shape in which a lower bar according to the present disclosure is coupled to side sills through rear lower members.
Figure 2:
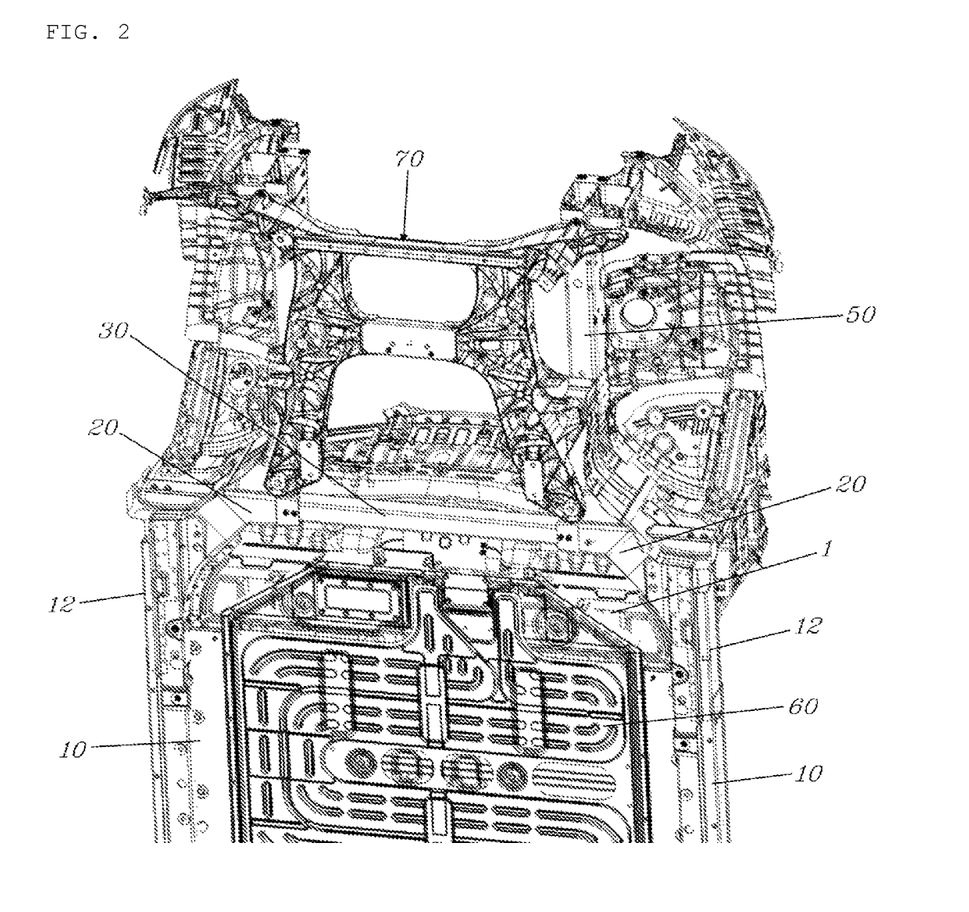
FIG. 2 is a view showing the shape in which a high-voltage battery and front side members are coupled to each other in FIG. 1.

FIG. 1 is a view showing the shape in which a lower bar 30 according to the present disclosure is coupled to side sills 10 through rear lower members 20, and FIG. 2 is a view showing the shape in which a high-voltage battery 60 and front side members 50 are coupled to each other in FIG. 1.

A center floor panel 1 is installed at the lower middle of a vehicle body, and a rear floor panel is installed at the rear of the center floor panel 1.

The high-voltage battery 60 is loaded on the lower part of the center floor panel 1. The high-voltage battery 60 may be mounted to parts constituting side frames of the vehicle body, e.g. the inner surfaces of the side sills 10, so as to be coupled to the vehicle body.

In addition, a dash panel 52 configured to partition a PE room and the interior of a vehicle compartment from each other is installed at the front of the vehicle body, and the front side members 50 are coupled to opposite sides of the front of the dash panel 52 in a forward-rearward direction.

Particularly, in the present disclosure, the lower bar 30 is coupled between the side sills 10 in order to protect the front and the side of the high-voltage battery 60.

The vehicle body includes side sills 10 coupled to opposite sides of the vehicle body in a forward-rearward longitudinal direction, rear lower members 20 coupled between the side sills 10 and front side members 50, and a lower bar 30 coupled to the side sills 10 while being coupled to the rear lower members 20 in a lateral direction.

For example, the side sills 10 are coupled to opposite sides of the center floor panel 1 in the forward-rearward longitudinal direction.

The lower bar 30 is coupled between the side sills 10. The lower bar 30 is coupled to rear lower members 20, which is coupled between the front side members 50 and the side sills 10.

That is, the lower bar 30 is coupled to the side sills 10 while being coupled to the rear lower members 20 in the lateral direction, whereby crash load is transmitted from the front side members 50 to the side sills 10 via the rear lower members 20 at the time of front crash/offset/small overlap crash of a vehicle. In particular, much of the load transmitted to the rear lower members 20 is distributed leftwards and rightwards through the lower bar 30. As a result, damage to the side sills 10, including the rear lower members 20, is prevented, whereby it is possible to protect the battery.

In addition, at the time of side crash of the vehicle, crash load is transmitted from the side sills 10 to the front side members 50 via the rear lower members 20 together with the lower bar 30 in a distributed state, whereby it is possible to cope with side crash more effectively than in a conventional structure configured to attenuate crash load using the side sills 10 alone to thus protect the battery.

Furthermore, in the present disclosure, the side sills 10 are coupled to opposite ends of the lower bar 30 in a U shape.

That is, the opposite ends of the lower bar 30 are coupled to front ends of the side sills 10, whereby the lower bar 30 and the side sills 10 are coupled to each other in a U shape.

Consequently, the left and right side sills 10 and the left and right rear lower members 20 are robustly connected to each other via the lower bar 30, whereby connectivity therebetween is improved. Consequently, it is possible to improve twisting and bending rigidities of the PE room and to distribute load caused by front/side crash in various leftward-rightward directions.

Figure 3:
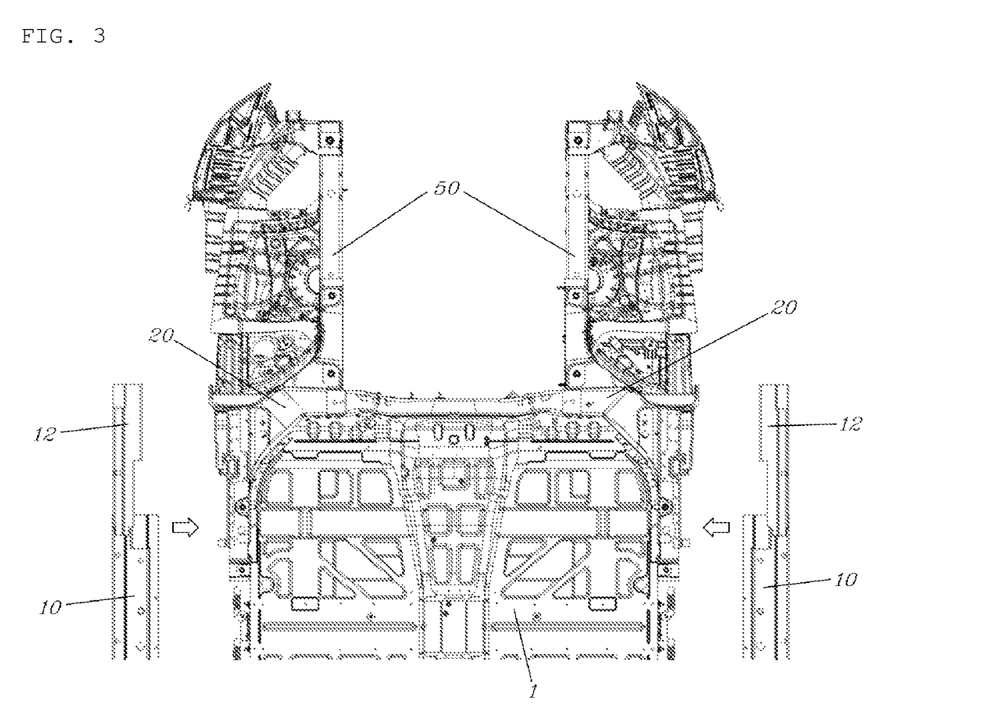
FIGS. 3 and 4 are views showing states before and after side reinforcement members are coupled to opposite sides of a vehicle body in the present disclosure, respectively.
Figure 4:
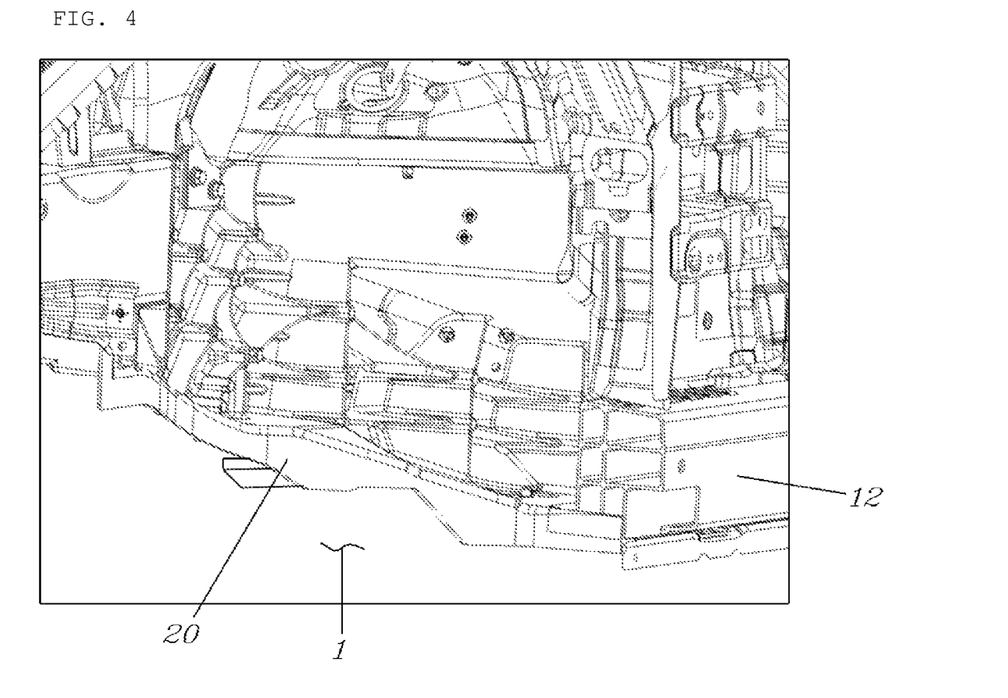

FIGS. 3 and 4 are views showing states before and after side reinforcement members are coupled to opposite sides of the vehicle body in the present disclosure, respectively.

A side reinforcement member 12 having a lattice-shaped section may be provided in each of the side sills 10 in a longitudinal direction, and a corresponding end of the lower bar may be coupled to the front end of the side reinforcement member 12.

For example, the side reinforcement member 12 is extruded in the longitudinal direction, is disposed so as to extend to the front of each of the side sills 10, and assembled to one side of the vehicle body using self-piercing rivets or flow drill screws.

The side reinforcement member 12 is formed so as to have a lattice-shaped sectional structure, and a tapping nut 14 is embedded in one end of the side reinforcement member 12 such that a bolt is coupled to the tapping nut 14 through the lower bar 30.

That is, the side of the vehicle body is protected through the side reinforcement members 12, whereby it is possible to cope with regulations/marketability/atypical side crash more effectively than in a structure configured to attenuate side crash load using the side sills 10 alone to thus safely protect the battery.

Figure 5:
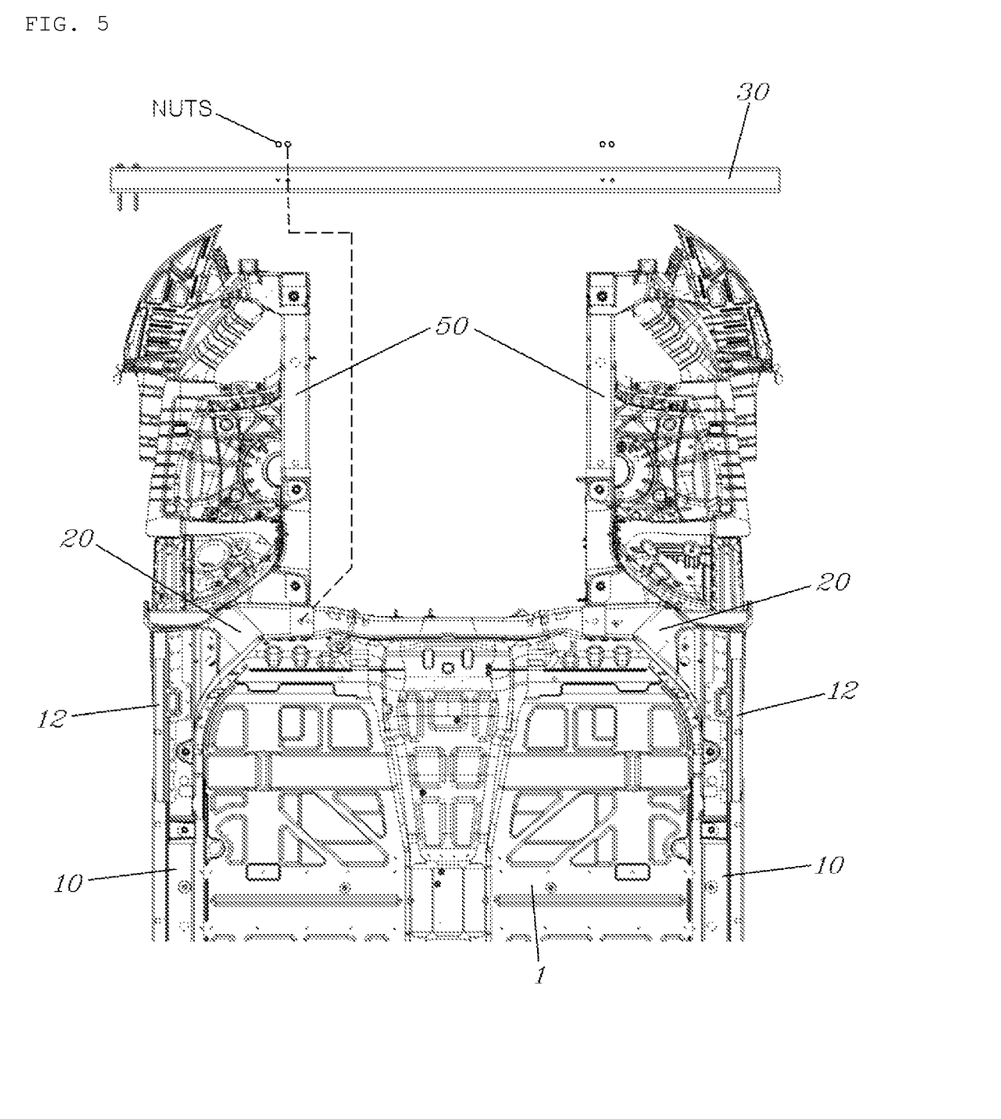
FIGS. 5 and 6 are views showing states before and after the lower bar is coupled to the vehicle body in the present disclosure, respectively.
Figure 6:
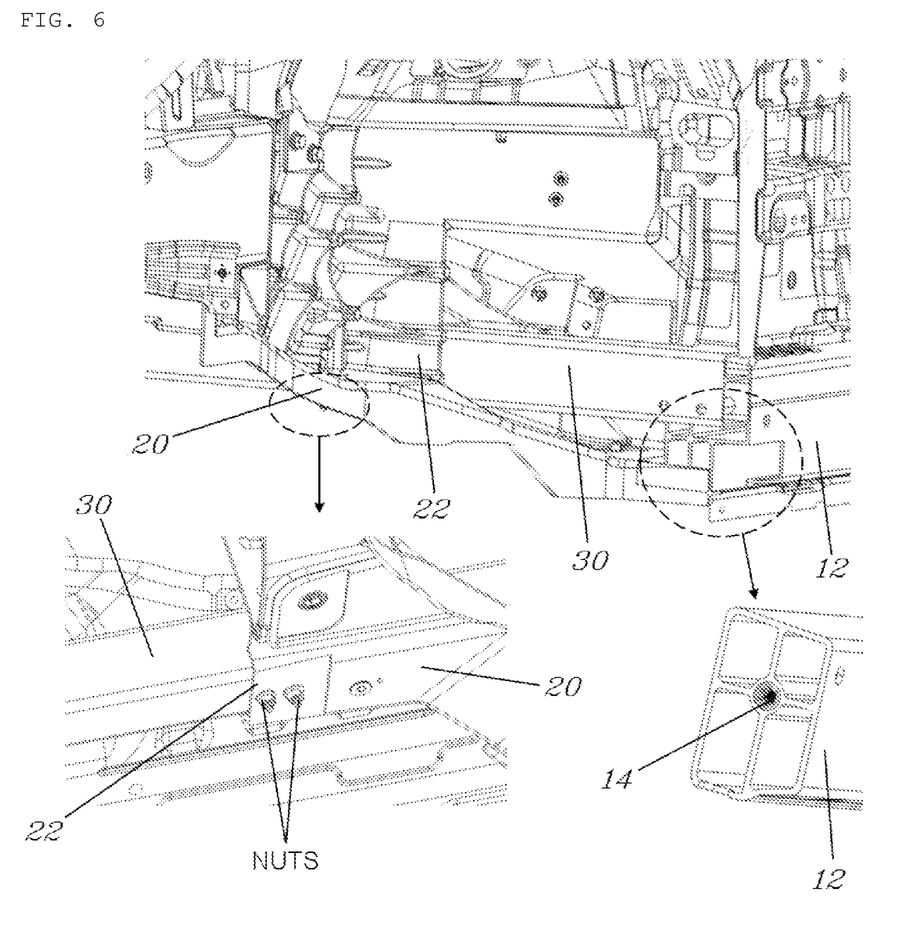

FIGS. 5 and 6 are views showing states before and after the lower bar 30 is coupled to the vehicle body in the present disclosure, respectively.

A through-hole 22 is formed in the middle of each of the rear lower members 20 in the lateral direction, and the lower bar 30 extends through the through-hole 22 and is coupled to the rear lower member 20.

For example, the front end of the rear lower member 20 is coupled to the bottom surface of the front side member. The rear end of the rear lower member 20 extends toward the front end of the side reinforcement member 12 and is coupled thereto so as to wrap the side of the side reinforcement member 12.

The lower bar 30 is formed in the shape of a straight pipe having a quadrangular closed-sectional structure. The lower bar 30 is inserted into the through-hole 22. In the through-hole 22, nuts are fastened to bolts extending through the lower part of the rear lower member 20, whereby the lower bar 30 is coupled to the rear lower member 20.

That is, the lower bar 30 extends through the rear lower member 20 and is coupled to the front end of the side reinforcement member 12 in a U shape. Consequently, the left and right side sills 10 and the left and right rear lower members 20 are robustly connected to each other via the lower bar 30, whereby connectivity therebetween is improved.

In addition, a rib 32 is formed in the lower bar 30 so as to extend between the front and rear inner walls thereof in a horizontal direction such that the inner space of the lower bar is partitioned into upper and lower parts.

That is, rigidity of the lower bar 30 is improved through the rib 32 formed in the lower bar 30, whereby it is possible to prevent bending of or damage to the lower bar 30 when crash load is applied to the lower bar 30.

Alternatively, the lower bar 30 may be divided into three parts, in addition to a single straight bar 30.

Figure 9:
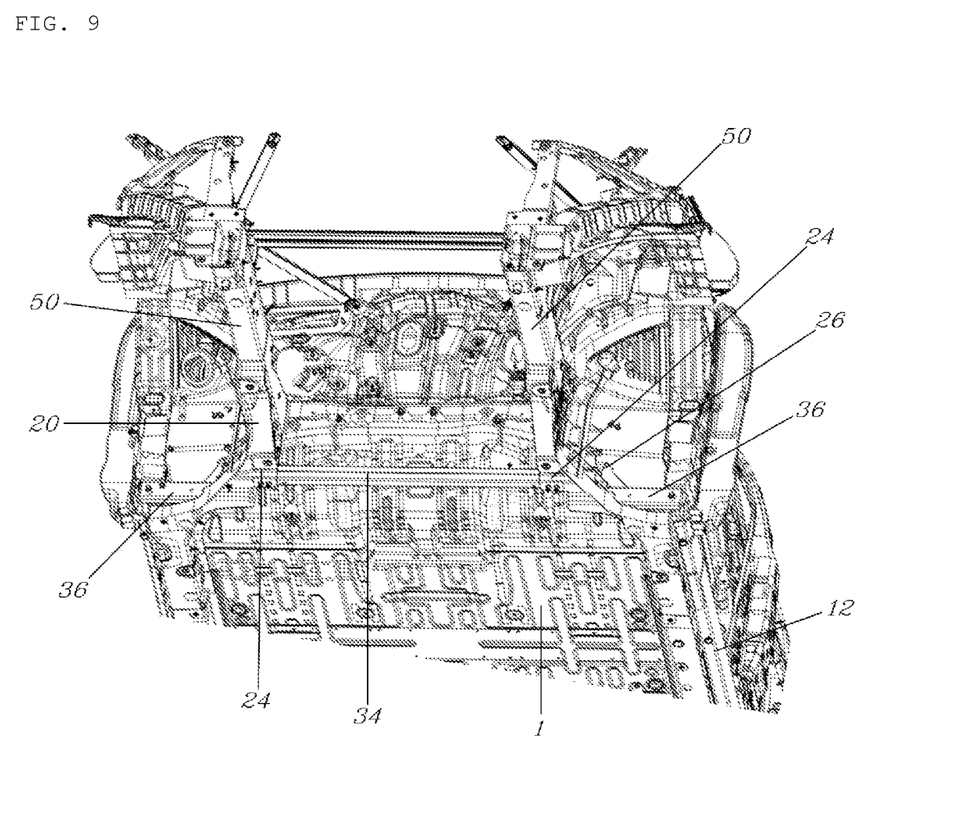
FIG. 9 is a view showing the structure of another embodiment of a lower bar including a center lower bar and side lower bars.

FIG. 9 is a view showing the structure of another embodiment of a lower bar 30 including a center lower bar 34 and side lower bars 36 in the present disclosure. The lower bar 30 includes a center lower bar 34 and side lower bars 36.

A center insertion recess 24 open at the inside thereof and a side insertion recess 26 open at the outside thereof are formed in the middle of each of the rear lower members 20 in the lateral direction, the center lower bar 34 is inserted into and coupled to the center insertion recesses 24, and each of the side lower bars 36 is inserted into and coupled to a corresponding one of the side insertion recesses 26. Here, each of the center lower bar 34 and the side lower bars 36 may be formed so as to have the same sectional shape as the lower bar 30 described above.

In addition, the side insertion recesses 26 are formed at the rear of the center insertion recess 24, whereby the center lower bar 34 is located farther forwards than the side lower bars 36.

That is, the center insertion recess 24 is formed in the inner surface of each of the left and right rear lower members 20, and opposite ends of the center lower bar 34 are inserted into and coupled to the center insertion recesses 24.

The side insertion recess 26 is formed in the outer surface of each of the left and right rear lower members 20. One end of the side lower bar 36 is inserted into and coupled to the side insertion recess 26, and the other end of the side lower bar 36 is coupled to the front end of the side reinforcement member 12.

That is, the center lower bar 34 and the side lower bars 36 are coupled to the front ends of the side reinforcement members 12 while being inserted into the rear lower members 20 in a U shape. Consequently, the left and right side sills 10 and the left and right rear lower members 20 are robustly connected to each other via the center lower bar 34 and the side lower bars 36, whereby connectivity therebetween is improved.

Figure 7:
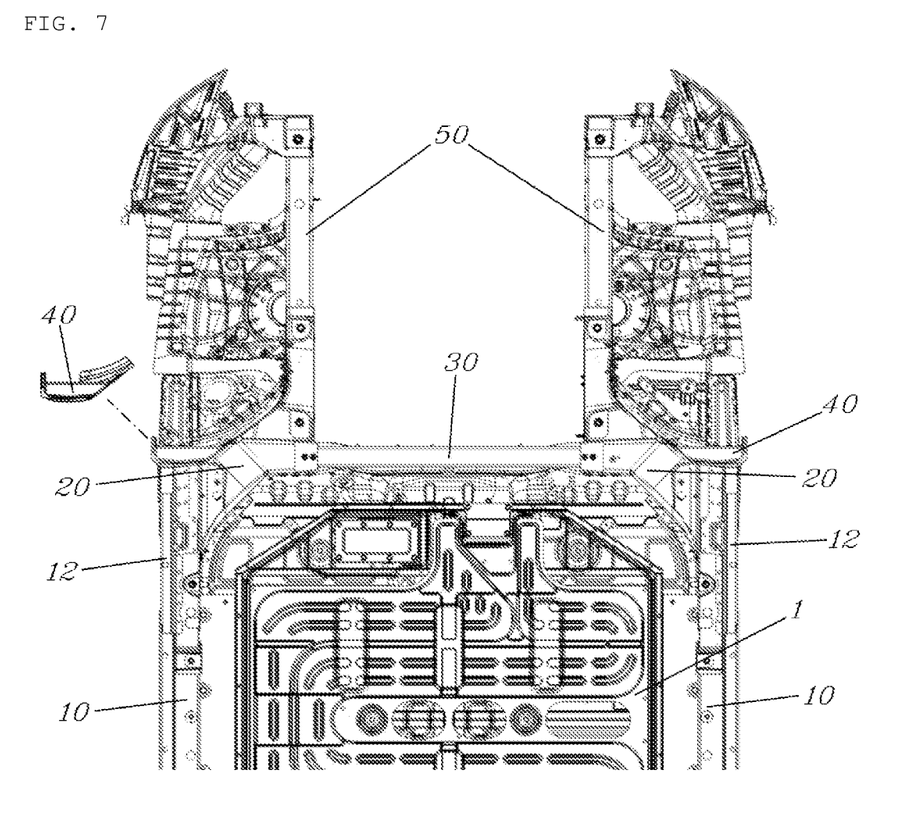
FIGS. 7 and 8 are views showing states before and after cover panels are coupled to the vehicle body in the present disclosure, respectively.
Figure 8:
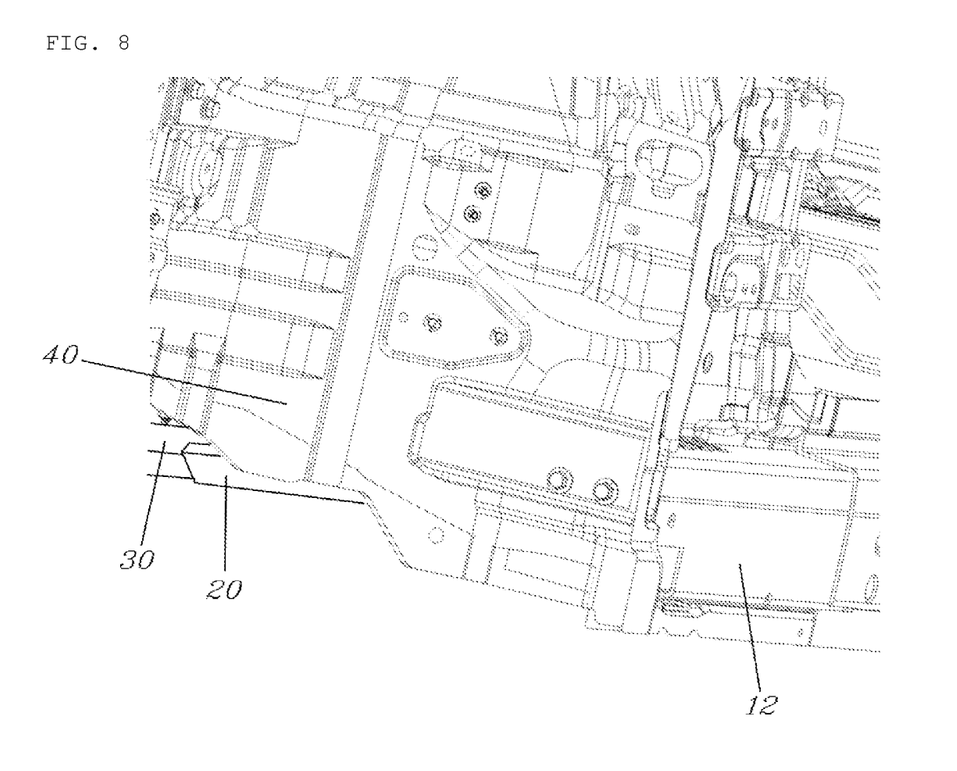

Meanwhile, FIGS. 7 and 8 are views showing states before and after cover panels 40 are coupled to the vehicle body in the present disclosure, respectively.

The cover panels 40 may be coupled so as to cover coupling portions between the side sills and the lower bar together with the outer surfaces of the rear lower members 20.

For example, each of the cover panels 40 is coupled to a peripheral portion to which the cover panel 40 is to be coupled by spot welding, and a bolt is coupled to the tapping nut of the side reinforcement member 12 through the cover panel 40 and the lower bar 30.

Figure 10:
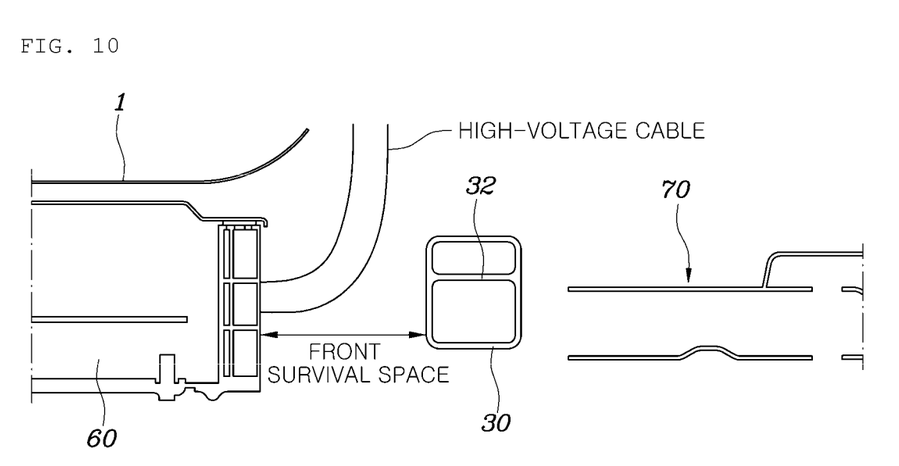
FIG. 10 is a view illustrating the dispositional relationship between the lower bar, the high-voltage battery, and a front subframe in the present disclosure.

FIG. 10 is a view illustrating the dispositional relationship between the lower bar 30, the high-voltage battery 60, and a front subframe 70 in the present disclosure.

The lower bar 30 may be disposed in front of the high-voltage battery 60 so as to be spaced apart therefrom by a predetermined distance.

The lower bar 30 may be disposed at the rear of the front subframe 70 so as to be spaced apart therefrom by a predetermined distance.

The distance between the lower bar 30 and the high-voltage battery 60 may be greater than the distance between the lower bar 30 and the front subframe 70.

That is, in the case in which the magnitude of load applied to the front subframe 70 is not large at the time of front crash of the vehicle as the front subframe 70 is disposed so as to be spaced apart from the lower bar 30, the load is not transmitted to the lower bar 30, whereby it is possible to protect the vehicle body.

In particular, as the lower bar 30 is disposed at the rear of the front subframe and is disposed so as to be spaced apart from the high-voltage battery 60 by a predetermined distance, the lower bar 30 supports the front subframe so as not to be pushed rearwards, whereby it is possible to prevent striking of and damage to the high-voltage battery 60 and a high-voltage cable due to rearward pushing of the front subframe. Consequently, it is possible to more safely protect the high-voltage battery 60.

Figure 11:
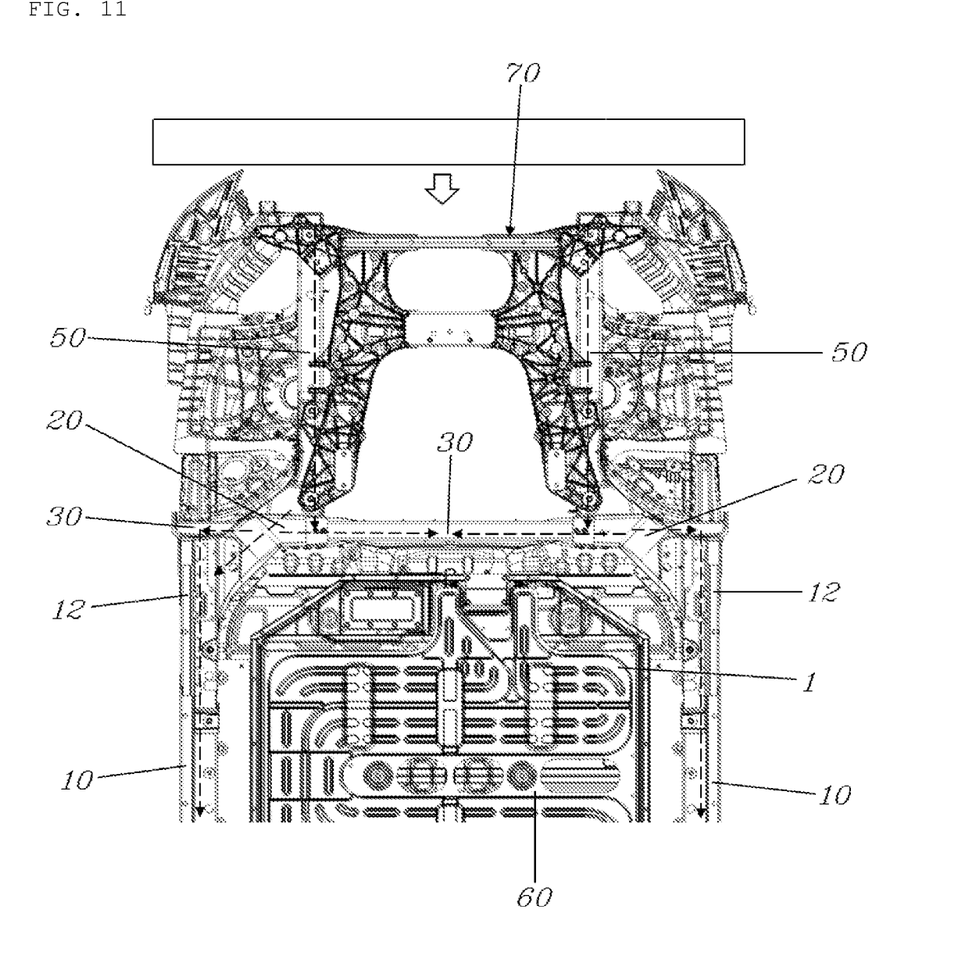
FIG. 11 is a view illustrating crash load distribution at the time of front crash of a vehicle body according to the present disclosure.

FIG. 11 is a view illustrating crash load distribution at the time of front crash of the vehicle body according to the present disclosure.

Crash load is transmitted from the front side members 50 to the rear lower members 20 and the lower bar 30 at the time of front crash of the vehicle.

The load transmitted to the rear lower members 20 is transmitted to the side sills 10, and the load transmitted to the lower bar 30 is transmitted to the side sills 10 while being distributed leftwards and rightwards.

Consequently, the crash load transmitted from the front side members 50 is distributed to several parts of the vehicle body via the lower bar 30, whereby it is possible to prevent damage to the side sills 10, including the rear lower members 20, to thus safely protect the battery.

Figure 12:
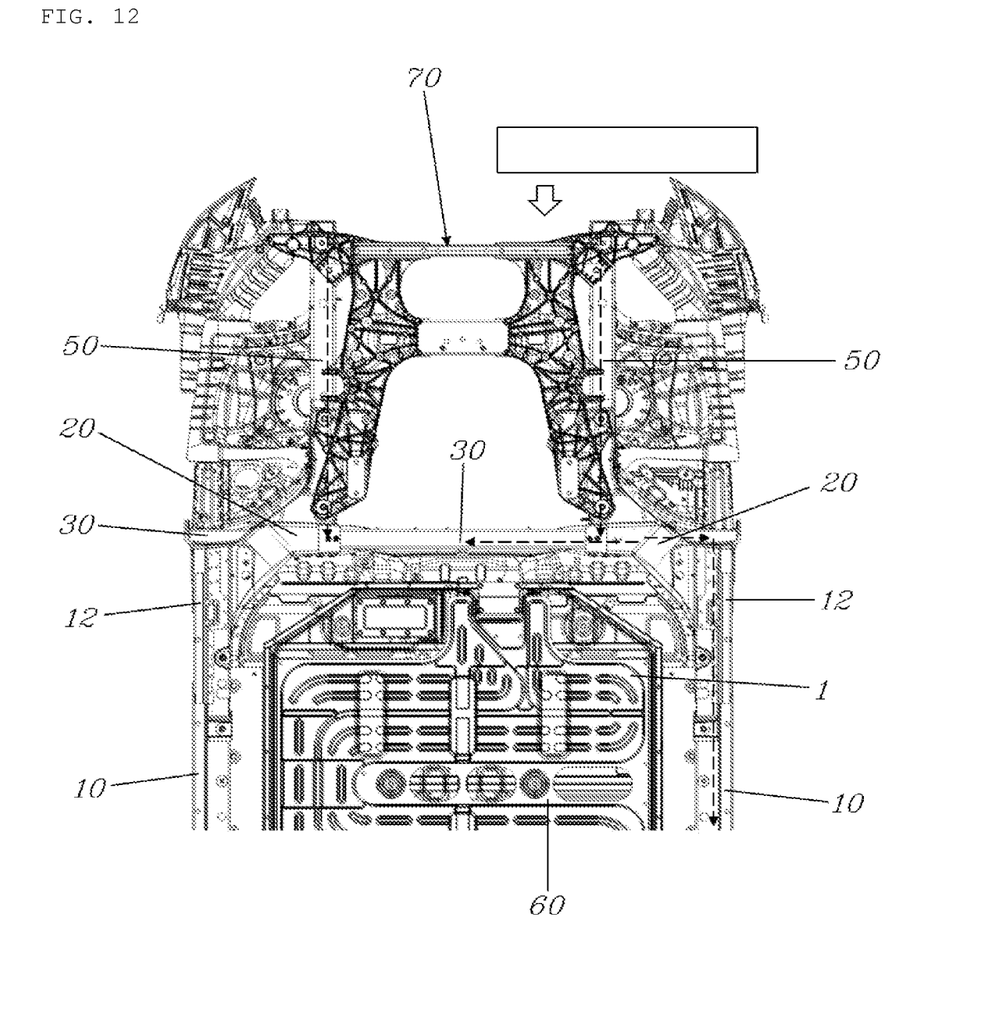
FIG. 12 is a view illustrating crash load distribution at the time of front offset crash of the vehicle body according to the present disclosure.

FIG. 12 is a view illustrating crash load distribution at the time of front offset crash/small overlap crash of the vehicle body according to the present disclosure.

Crash load is transmitted from one of the front side members 50 to a corresponding one of the rear lower members 20 and the lower bar 30 at the time of front offset crash/small overlap crash of the vehicle.

The load transmitted to the rear lower member 20 is transmitted to the side sill 10, and the load transmitted to the lower bar 30 is transmitted to the side sill 10 while being distributed leftwards and rightwards.

Consequently, the crash load transmitted from the front side member 50 is distributed to several parts of the vehicle body via the lower bar 30, whereby it is possible to prevent damage to the side sill 10, including the rear lower member 20, to thus safely protect the battery.

Figure 13:
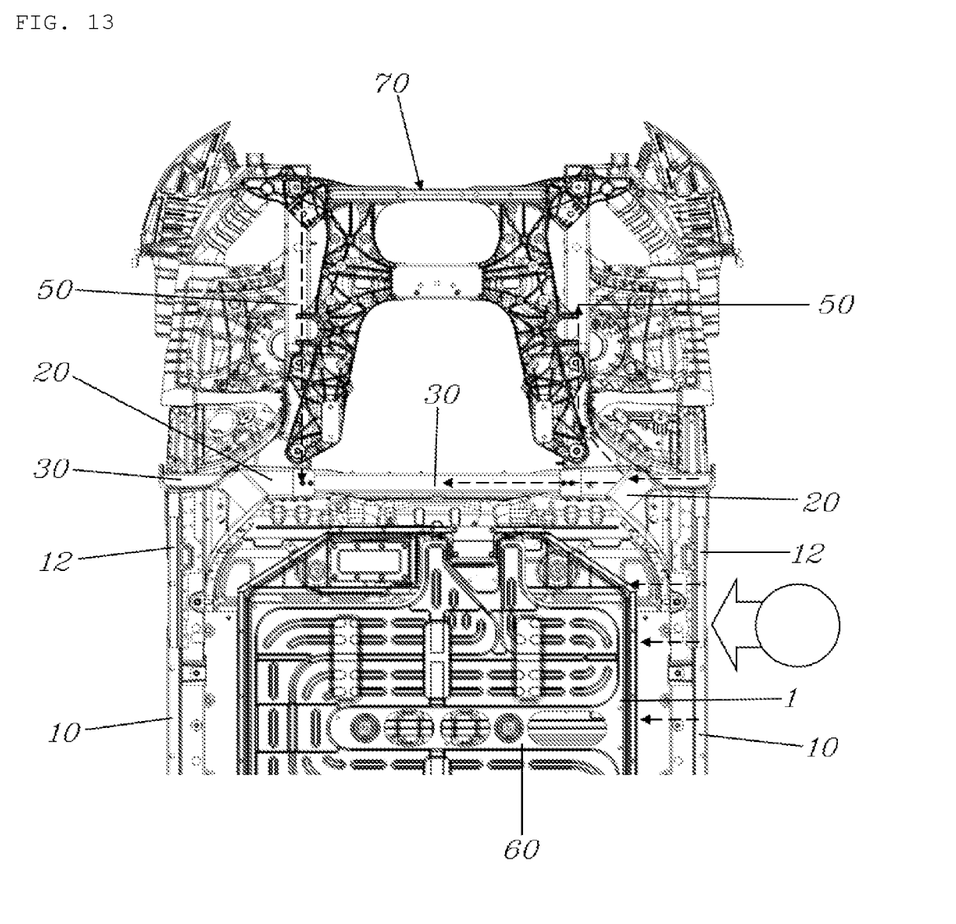
FIG. 13 is a view illustrating crash load distribution at the time of side crash of the vehicle body according to the present disclosure.

FIG. 13 is a view illustrating crash load distribution at the time of side crash of the vehicle body according to the present disclosure.

Crash load is transmitted from one of the side sills 10 to a corresponding one of the rear lower members 20 and one end of the lower bar 30 at the time of side crash of the vehicle.

The load transmitted to the rear lower member 20 is transmitted to a corresponding one of the front side members 50, and the load transmitted to one end of the lower bar 30 is transmitted to the other end of the lower bar 30, whereby the load is distributed.

Consequently, the crash load transmitted to the side sill 10 is distributed to several parts of the vehicle body via the lower bar 30, whereby it is possible to effectively cope with side crash to thus safely protect the battery.

As is apparent from the above description, crash load transmitted from the front side members is distributed to the side sills and the left and right parts of the lower bar as well as the rear lower members via the lower bar at the time of front crash/offset/small overlap crash of the vehicle, whereby it is possible to prevent damage to the side sills, including the rear lower members, to thus safely protect the battery.

In addition, at the time of side crash of the vehicle, crash load transmitted from the side sills is distributed to the front side members and the lower bar via the rear lower members, whereby it is possible to effectively cope with side crash to thus safely protect the battery.

Although the exemplary embodiments of the present disclosure have been described above with reference to the accompanying drawings, those skilled in the art will appreciate that the present disclosure can be implemented in various other embodiments without changing the technical ideas or features thereof.

That is, although the electric vehicle equipped with the high-voltage battery 60 has been described in the present disclosure, the lower bar may also be applied to a connection structure between front side members 50 and side sills 10 of an internal combustion engine vehicle.

What is claimed is:

1. A vehicle body comprising:
   side sills coupled to opposite sides of the vehicle body in a forward-rearward longitudinal direction of the vehicle body;
   rear lower members coupled between the side sills and front side members; and
   a lower bar coupled to the side sills while being coupled to the rear lower members in a lateral direction of the vehicle body,
   wherein the lower bar is mounted to cross the rear lower members,
   wherein the lower bar comprises a center lower bar and side lower bars,
   wherein each of the rear lower members has a center insertion recess open at an inside thereof and a side insertion recess open at an outside thereof in the lateral direction,
   wherein the center lower bar extends through and is coupled to the center insertion recesses, and
   wherein each of the side lower bars extends through and is coupled to a corresponding one of the side insertion recesses.

2. The vehicle body according to claim 1, wherein the side sills are coupled to opposite ends of the lower bar in a U shape.

3. The vehicle body according to claim 1,
   wherein each of the side sills has a side reinforcement member extending in a longitudinal direction and having a lattice structure therein, and
   wherein a front end of the side reinforcement member is coupled to a corresponding end of the lower bar.

4. The vehicle body according to claim 1, wherein each of the rear lower members has a through-hole extending in the lateral direction, and
   wherein the lower bar extends through the through-hole and is coupled to the rear lower members.

5. The vehicle body according to claim 1, wherein the lower bar includes a rib extending between front and rear inner walls of the lower bar.

6. The vehicle body according to claim 1, wherein the center insertion recess includes the side insertion recess at a rear of the center insertion recess, whereby the center lower bar is located farther forwards than the side lower bars.

7. The vehicle body according to claim 1, wherein cover panels are coupled so as to cover coupling portions between the side sills and the lower bar together with outer surfaces of the rear lower members.

8. The vehicle body according to claim 1, wherein the lower bar is disposed in front of a high-voltage battery so as to be spaced apart from the high-voltage battery by a predetermined distance.

9. The vehicle body according to claim 1, wherein the lower bar is disposed at a rear of a front subframe so as to be spaced apart from the front subframe by a predetermined distance.

* * * * *